(12) United States Patent
Bryant

(10) Patent No.: US 11,064,211 B2
(45) Date of Patent: *Jul. 13, 2021

(54) ADVANCED VIDEO CODING METHOD, SYSTEM, APPARATUS, AND STORAGE MEDIUM

(71) Applicant: New Cinema, LLC, Austin, TX (US)

(72) Inventor: Todd Bryant, Austin, TX (US)

(73) Assignee: New Cinema, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,388

(22) Filed: Nov. 4, 2019

(65) Prior Publication Data

US 2020/0128262 A1    Apr. 23, 2020

Related U.S. Application Data

(63) Continuation of application No. 15/950,858, filed on Apr. 11, 2018, now Pat. No. 10,469,851, which is a continuation-in-part of application No. 14/731,135, filed on Jun. 4, 2015, now abandoned, which is a continuation-in-part of application No. 13/863,732, filed on Apr. 16, 2013, now abandoned.

(60) Provisional application No. 61/624,440, filed on Apr. 16, 2012.

(51) Int. Cl.
| | |
|---|---|
| *H04N 19/186* | (2014.01) |
| *H04N 19/172* | (2014.01) |
| *H04N 19/182* | (2014.01) |
| *H04N 19/146* | (2014.01) |
| *H04N 19/51* | (2014.01) |

(Continued)

(52) U.S. Cl.
CPC ......... *H04N 19/186* (2014.11); *H04N 19/115* (2014.11); *H04N 19/146* (2014.11); *H04N 19/167* (2014.11); *H04N 19/172* (2014.11); *H04N 19/174* (2014.11); *H04N 19/182* (2014.11); *H04N 19/51* (2014.11); *H04N 19/117* (2014.11); *H04N 19/14* (2014.11)

(58) Field of Classification Search
CPC .... H04N 19/115; H04N 19/117; H04N 19/14; H04N 19/146; H04N 19/167; H04N 19/172; H04N 19/174; H04N 19/182; H04N 19/186; H04N 19/51
See application file for complete search history.

(56) References Cited

U.S. PATENT DOCUMENTS 10,469,851 B2 * 11/2019 Bryant ................. H04N 19/172
2004/0057514 A1    3/2004 Kishi (Continued)

OTHER PUBLICATIONS

Liu, Pengyu, et al., An Adaptive Motion Estimation Scheme for Video Coding, Feb. 11, 2014, vol. 2014 (2014), The Scientific World Journal.

(Continued)

*Primary Examiner* — Joon Kwon
(74) *Attorney, Agent, or Firm* — Hunt Pennington Kumar & Dula pllc

(57) ABSTRACT

A method, apparatus, system and computer-implemented non-transitory memory may encode h.264/AVC compliant video with region of interest compression, wherein a hybrid region of interest of each frame may include both an enlarged luminance region of interest of each frame and in addition thereto an excess portion of an enlarged chrominance region of interest of each frame, in excess of the enlarged luminance region of interest of each frame.

10 Claims, 15 Drawing Sheets

(51) Int. Cl.
*H04N 19/167* (2014.01)
*H04N 19/174* (2014.01)
*H04N 19/115* (2014.01)
*H04N 19/14* (2014.01)
*H04N 19/117* (2014.01)

(56) References Cited

U.S. PATENT DOCUMENTS

| | | |
|---|---|---|
| 2004/0091158 A1 | 5/2004 | Miled et al. |
| 2006/0215766 A1 | 9/2006 | Wang et al. |
| 2007/0003151 A1 | 1/2007 | Kawahara |
| 2007/0076957 A1 | 4/2007 | Wang et al. |
| 2007/0183661 A1 | 8/2007 | El-Maleh et al. |
| 2007/0274385 A1 | 11/2007 | He |
| 2008/0129844 A1 | 6/2008 | Cusack et al. |
| 2008/0152245 A1 | 6/2008 | El-Maleh et al. |
| 2008/0240250 A1 | 10/2008 | Lin et al. |
| 2010/0098162 A1 | 4/2010 | Lu et al. |
| 2010/0284460 A1 | 11/2010 | Tsai et al. |
| 2012/0105668 A1 | 5/2012 | Velarde et al. |

OTHER PUBLICATIONS

Sarwer, Mohammed Golam, "Efficient Motion Estimation and Mode Decision Algorithms for Advanced Video Coding," 2011, Paper 439, University of Windsor, Scholarship at UWinddsor.

\* cited by examiner

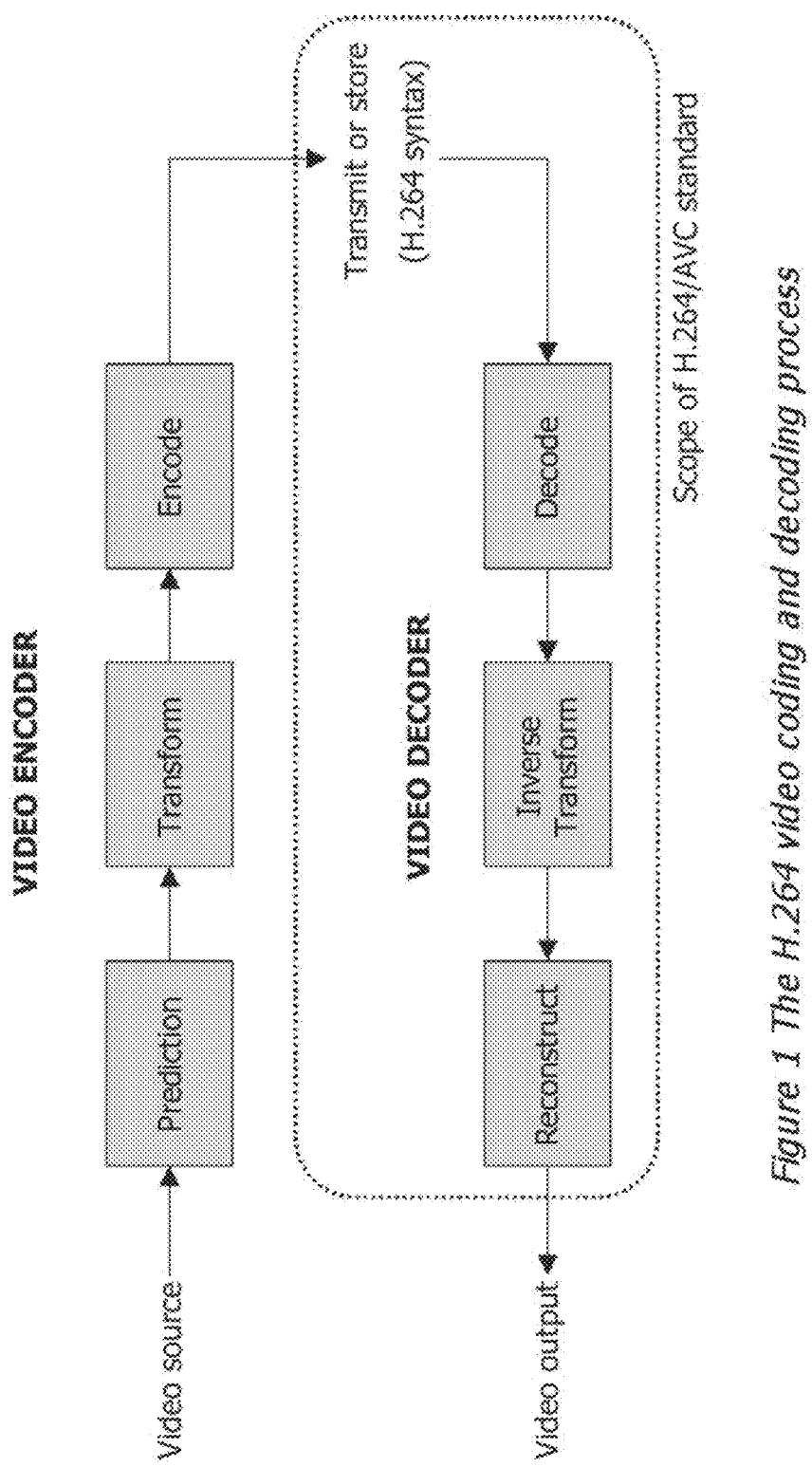
Figure 1 The H.264 video coding and decoding process

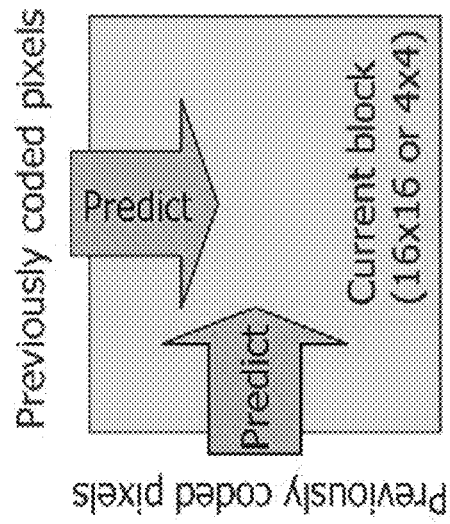
*Figure 2 Intra prediction*
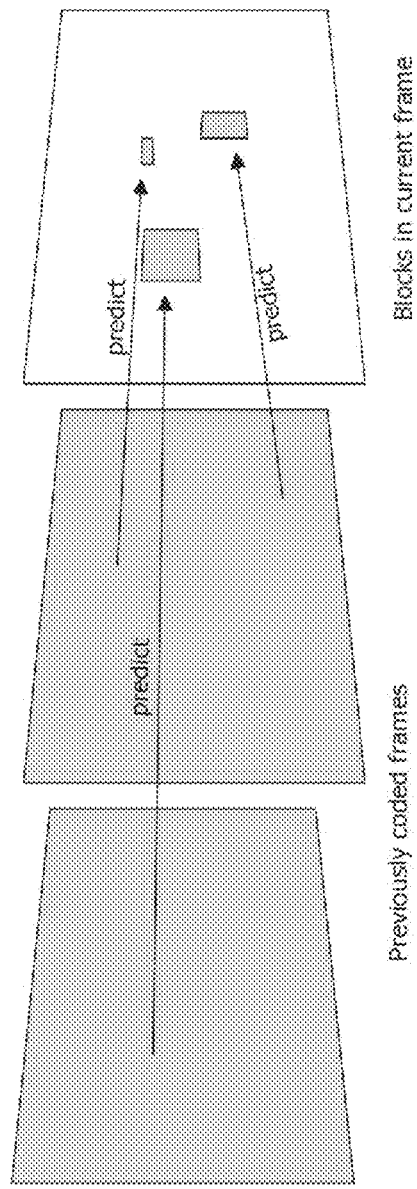
*Figure 3 Inter prediction*

Figure 4 Inverse transform: combining weighted basis patterns to create a 4x4 image block

ADVANCED VIDEO CODING METHOD, SYSTEM, APPARATUS, AND STORAGE MEDIUM

CROSS REFERENCE TO RELATED APPLICATIONS

This application claims the priority of U.S. Ser. No. 14/731,135 filed on Jun. 4, 2015 and entitled "ADVANCED VIDEO CODING METHOD, APPARATUS, AND STORAGE MEDIUM," which claims the priority U.S. Ser. No. 13/863,732 filed on Apr. 16, 2013 and entitled "ADVANCED VIDEO CODING METHOD, APPARATUS, AND STORAGE MEDIUM," which claims the priority of U.S. 61/624,440 filed on Apr. 16, 2012 and entitled "ADVANCED VIDEO CODING METHOD, APPARATUS, AND STORAGE MEDIUM," each of the preceding in entirety being incorporated by reference.

FIELD OF THE INVENTION

This disclosure relates to video compression, and particularly to region of interest compression.

BACKGROUND OF THE INVENTION

H.264 is an industry standard for video compression, the process of converting digital video into a format that takes up less capacity when it is stored or bandwidth when transmitted. Video compression (or video coding) is a technology incorporated in applications such as digital television, DVD-Video, mobile TV, videoconferencing and Internet video streaming, among others. An encoder converts video into a compressed format and a decoder converts compressed video back into an uncompressed format. Standardizing video compression makes it possible for products from different manufacturers (e.g. encoders, decoders and storage media) to inter-operate.

Recommendation H.264: Advanced Video Coding is a document published by the international standards bodies ITU-T (International Telecommunication Union) and ISO/IEC (International Organization for Standardization/International Electrotechnical Commission). It defines a format (syntax) for compressed video and a method for decoding this syntax to produce a displayable video sequence. The standard document does not actually specify how to encode (compress) digital video—this is left to the manufacturer of a video encoder—but in practice the encoder is likely to mirror the steps of the decoding process.

The H.264/AVC standard was first published in 2003. It builds on the concepts of earlier standards such as MPEG-2 and MPEG-4 Visual and offers the potential for better compression efficiency (i.e. better-quality compressed video) and greater flexibility m compressing, transmitting and storing video.

BRIEF SUMMARY OF THE INVENTION

The contents of "H.264 and MPEG-4 Video Compression: Video Coding for Next Generation Multimedia" (by Richardson, Lain E.), John Wiley & Sons (306 pages, 2004); "The H.264 Advanced Video Compression Standard" (by Richardson, Lain E.), John Wiley & Sons (346 pages, 2011); and "High Efficiency Video Coding: Coding Tools and Specification (by Wien, Mathias), Springer-Verlag Berlin Heidelberg (314 pages, 2014) are incorporated by reference in their entireties.

Disclosed subject matter provides a system for video coding, method for video coding, apparatus for video coding, and computer readable storage medium for video coding. The aforementioned may be embodied in, encompass or include an encoder, decoder, hardware, software, executable code, and processor executable instructions accessible in a storage medium. One of ordinary skill will understand that, as used herein, "video coding" may include, without limitation, the following: video compression, coding, encoding, decoding, processing, preprocessing, and the performing of functions and actions relating, accompanying, preceding or following video compression, such as may occur for transmission or storage of compressed video. One example, without limitation, may be video compression, coding, encoding, decoding, processing, preprocessing and functions relating, accompanying, preceding, following, aiding, preparing, overlapping, or simultaneous with video compression in accordance with the H.264 standard or H.264/AVC standard. It will be understood that, as used herein, "video coding" may include any function or action occurring in close relationship to video compression, coding, encoding, decoding or processing, and may include any functions or actions preceding, following, aiding, preparing, overlapping or simultaneous with video compression. It will be understood that, as used herein, video coding may include any function or action performed in accordance with, or by functioning of, systems, methods, apparatus, and computer readable storage mediums for video processing, and may be embodied in, encompass, or include hardware, software, executable code or executable instructions for video processing.

These and other aspects of the disclosed subject matter, as well as additional novel features, will be apparent from the description provided herein. The intent of this summary is not to be a comprehensive description of the subject matter, but rather to provide an overview of some of the subject matter's functionality. Other systems, methods, features and advantages here provided will become apparent to one with skill in the art upon examination of the following Figures and detailed description. It is intended that all such additional systems, methods, features and advantages that are included within this description be within the scope of the appended claims and any claims filed later.

BRIEF DESCRIPTION OF THE FIGURES

FIG. 1 depicts an embodiment wherein an encoder performs H.264 video compression encoder carrying out prediction, transform and encoding processes.

FIG. 2 depicts an embodiment including intra prediction using 16×16 and 4×4 block sizes to predict a macroblock from surrounding, previously-coded pixels within the same frame.

FIG. 3 depicts an embodiment including inter prediction using a range of block sizes (from 16×16 down to 4×4) to predict pixels in the current frame from similar regions in previously-coded frames.

FIG. 4 depicts an embodiment including a DCT transform providing an image block wherein each basis pattern is weighted according to a coefficient value, and the weighted basis patterns are combined.

DETAILED DESCRIPTION

Figure 5:
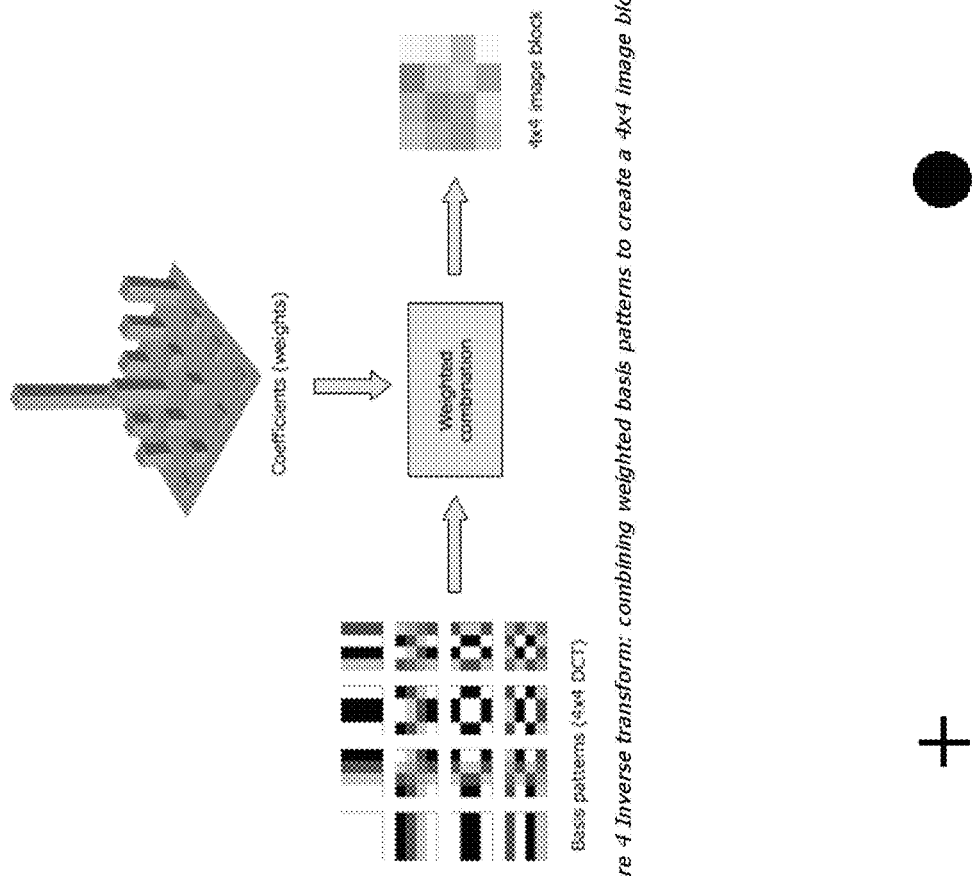
FIG. 5 depicts an exemplary embodiment having an aspect relating to a blind spot.

In the following detailed description of embodiments, reference is made to the accompanying drawings, which form a part hereof, and in which is shown by way of illustration specific exemplary embodiments in which the disclosed subject matter may be practiced. Embodiments are described in sufficient detail to enable those of ordinary skill in the art to practice the disclosed subject matter and embodiments, and it is to be understood that other embodiments may be utilized and that logical, mechanical and electrical changes may be made without departing from the scope of the disclosed subject matter. The following detailed description is, therefore, not to be taken in a limiting sense, and the scope of the disclosed subject matter is defined only by the claims.

FIG. 1 depicts an embodiment wherein an encoder performs H.264 video compression encoder carrying out prediction, transform and encoding processes. FIG. 2 depicts an embodiment including intra prediction using 16×16 and 4×4 block sizes to predict a macroblock from surrounding, previously-coded pixels within the same frame. FIG. 3 depicts an embodiment including inter prediction using a range of block sizes (from 16×16 down to 4×4) to predict pixels in the current frame from similar regions in previously-coded frames.

FIG. 4 depicts an embodiment including a DCT transform providing an image block wherein each basis pattern is weighted according to a coefficient value, and the weighted basis patterns are combined.

In embodiments as illustrated in FIGS. 1, 2, 3 and 4, an encoder may perform prediction. An encoder may process a frame of video in units of a Macroblock (16×16 displayed pixels). An encoder may form a prediction of the macroblock based on previously-coded data, either from the current frame (intra prediction) or from other frames that have already been coded and transmitted (inter prediction). An encoder may subtract the prediction from the current macroblock to form aresidual.

In embodiments as illustrated in FIGS. 1, 2, 3 and 4, an encoder may include and perform prediction methods supported by H.264 that may be more flexible and that may enable accurate prediction and more efficient video compression. In embodiments, intra prediction may, for example, use 16×16 and 4×4 block sizes to predict a macroblock from surrounding, previously-coded pixels within the same frame (see particularly, for example, FIG. 2). Inter prediction may use a range of block sizes (from 16×16 down to 4×4) to predict pixels in the current frame from similar regions in previously-coded frames (see particularly, for example, FIG. 3). In embodiments as illustrated in FIGS. 1, 2, 3 and 4, an encoder may perform transform and quantization. It will be understood that identifying a suitable inter-coding prediction may be described as motion estimation, and subtracting an inter-coding prediction from a current macroblock to produce a difference block, or block of residuals, may be described as motion compensation.

In embodiments as illustrated in FIGS. 1, 2, 3 and 4, generally ablock of residuals or differences may be transformed using a transform such as, for example, a 4×4 or 8×8 integer transform, and may be transformed, for example, using an approximate form of the Discrete Cosine Transform (DCT). In embodiments, a transform may output a set of coefficients, each of which is a weighting value for a standard basis pattern. When combined, the weighted basis patterns may re-create the block of residual samples. FIG. 4 illustrates for an embodiment how a transform, such as an inverse DCT, may create an image block by weighting each basis pattern according to a coefficient value and combining the weighted basis patterns.

In embodiments as illustrated in FIGS. 1, 2, 3 and 4, a transform operation may provide a block of transform coefficients, which may be quantized, such as by each coefficient being divided by an integer value. Quantization reduces the precision of the transform coefficients according to a quantization parameter (QP). The result may be a block in which most or all of the coefficients are zero, with a few non-zero coefficients. Setting QP to a high value means that more coefficients are likely to be zero, such that relatively high or more compression with reduced decoded image quality may result. Setting QP to a low value means that more non-zero coefficients may remain after quantization, such that relatively low or less compression with increased decoded image quality may result.

In embodiments as illustrated in FIGS. 1, 2, 3 and 4, an encoder may perform bitstream encoding. In embodiments, the video coding may produce a number of values that are encoded to form a compressed bitstream. For example, these values may include: quantized transform coefficients, information to enable the decoder to re-create the prediction, information about the structure of the compressed data and the compression tools used during encoding, and information about the complete video sequence. In embodiments, the aforementioned values and parameters (syntax elements) may be converted into binary codes using variable length coding and/or arithmetic coding. In embodiments, encoding methods may produce an efficient, compact binary representation of the information. In embodiments, an encoded bitstream can be stored and/or transmitted.

In embodiments as illustrated in FIGS. 1, 2, 3 and 4, a decoder may perform bitstream decoding. A video decoder may receive a compressed H.264 bitstream, decode each of the syntax elements and extract the information described above (quantized transform coefficients, prediction information, etc). This information may be used to reverse the coding process and recreate or reconstruct a sequence of video images, pictures or group of pictures (GOP).

In an embodiment as illustrated in FIGS. 1, 2, 3 and 4, decoder processes may include rescaling and inverse transform. The quantized transform coefficients may be re-scaled. Each coefficient may be multiplied by an integer value to restore its original scale. An inverse transform may combine the standard basis patterns, weighted by the re-scaled coefficients, to re-create each block of residual data. These blocks may be combined to form a residual macroblock.

In an embodiment as illustrated in FIGS. 1, 2, 3 and 4, decoder processes may include reconstruction. For each macroblock, the decoder may form a prediction identical to a prediction created by the encoder. The decoder may add the prediction to the decoded residual to reconstruct a decoded macroblock. Such a decoded macroblock may then be displayed as part of a video frame or picture.

Embodiments of disclosed subject matter as illustrated in FIGS. 1, 2, 3 and 4, may provide improved video compression performance. Embodiments of disclosed subject matter may provide improved video compression performance, for example, for video compression according to standard H.264. Embodiments of disclosed subject matter may provide improved image quality at a particular compressed bitrate. Embodiments may provide reduced compressed bitrate for a particular image quality.

Embodiments of disclosed subject matter may provide or include, for example, an encoder for coding compressed video according to the H.264 standard at an improved bitrate such as, for example, 3.6 Mbits per second, and having a certain compressed video quality comparable to compressed video encoded at a higher bitrate. One of ordinary skill will understand the improvements provided by such embodiments, in comparison to existing Video On Demand (VOD) systems that may code compressed video according to the H.264 standard and having the same certain compressed video quality at higher rates such 7 to 9 Mbits per second. It will be understood that video quality may be characterized according to objective standards such as, for example, Differential Mean Option Score (DMOS). Embodiments of disclosed subject matter may include a network for delivery of compressed video, such as by streaming the compressed video, wherein the network includes or is in communication with an encoder for receiving compressed video, wherein the encoder is configured to encode compressed video according to the H.264 standard at an improved bitrate such as, for example, 3.6 Mbits per second, and having a certain compressed video quality. One of ordinary skill will understand that such a network may have improved capacity and reduced cost for delivering or streaming compressed video. It will be understood that in embodiments, savings may be realized in the following operations and processes: (a) reduction of backhaul and distribution costs to multiple VOD plants; (b) reduction of network utilization and increasing of network reliability in relation to amount of data on the network; (c) increasing the capacity of network infrastructure to make available VOD content titles, such as by number of titles and, for example, by the aforementioned number of titles being doubled; (d) increasing capacity of network infrastructure having an associated network bandwidth to deliver or deploy compressed video, or serve subscribers, such as by increasing the number of subscribers served over the same associated network bandwidth.

Embodiments of disclosed subject matter may include encoders providing improved coding of compressed video lacking certain omitted information, wherein the certain omitted information is established by reference to information provided by perceptual functioning of the human vision system. It will be understood that certain omitted information may be determined by perceptual functioning of the human vision system in perceiving reconstructed video lacking certain omitted information in relation to a model or modeling of human vision system viewing such reconstructed video.

In an embodiment, an encoder may include at least one processor operable to perform edge detection for identifying a region of interest. Edge detection is a tool in image processing and computer vision, particularly in the areas of feature detection and feature extraction, which aim at identifying points in a digital image at which the image brightness changes sharply or, more formally, has discontinuities. In an embodiment, detecting edges of a region of interest may be performed prior to encoding compressed video. In an embodiment including edge detection of a region of interest, inter-frame movement of pixels may be tracked with improved computational efficiency because computations to track certain pixels of the object of interest, or region of interest, may be stopped when an edge of an object of interest, or region of interest, is approached by the tracked certain pixels of interest. It will be understood that both a motion estimation algorithm and bitrate control for processing video data of an object of interest, or region of interest, can be improved and performed to provide greater image quality, reduced processing load, or both, and to further compress video data of a background region other than the object of interest or region of interest. The preceding may be performed to provide a target bitrate. Such a target bitrate may be constant or may change.

In embodiments tracking of pixels by motion estimation, intra-coding prediction and inter-coding prediction may be performed and provided with improved efficiency, calculation efficiency, image quality, prediction quality, estimation quality, estimation efficiency, compensation quality, compensation efficiency, accuracy, processing speed, processmg efficiency, coding speed, coding efficiency, bitrate, decoding speed, decoding efficiency, reconstruction quality, and/or reconstruction efficiency. In embodiments, coding may remove more bits during the encoding process without sacrificing quality.

In embodiments, pixels in an object of interest or region of interest may be tracked. In embodiments, tracking pixels in an object of interest or region of interest may provide and may enable encoding at reduced or relatively low bitrate, or may provide improved image quality at a given bitrate, by selectively providing higher bitrate processing, reduced compression and corresponding higher image quality for pixels or video data for such an object of interest or region of interest, and lesser bitrate processing, higher compression and corresponding lower image quality for pixels or video data of a background region that is of less importance or less visual attention according to a model of visual perception. In embodiments, processing pixels or image data of an object of interest or region of interest at a higher bitrate with less compression, and processing pixels or image data of an object of interest or region of interest at a loweer bitrate with higher or greater compression, may provide higher clarity and higher image qualify for an object of interest, or region of interest, where viewed in accordance with a model of visual perception or where viewed by actual viewers.

In embodiments including an advanced motion estimation algorithm as herein disclosed, an object of interest or region of interest may be sharpened or made sharp in relation to a background region.

In embodiments, compression performance is improved in combination with, or m addition to, compression options and transmission support being improved by greater flexibility. In such embodiments, for example, compression performance may be improved in combination with: High Definition DVD's (such as HD-DVD and Blu-Ray formats), High Definition TV broadcasting or streaming, NATO and US DoD video applications, mobile broadcasting (iPad, Tablet, Smart Phone, etc.); Internet video, and videoconferencing.

In embodiments, an encoder may code compressed video according to the H.264 standard and may provide real-time or near real-time encoding of a bitstream for live broadcasting. In embodiments, an encoder may provide increased network utilization. Embodiments may provide for prolonging the life of current hardware and network assets of the cable or Telco MSO. This will represent significant savings for these entities.

In embodiments, an encoder may provide compressed video that is compressed by thirty percent (30%) more than compressed video of equal quality and provided by other encoders. In embodiments, an encoder may provide compressed video that is compressed by fifty percent (50%) more than compressed video of equal quality and provided by other encoders. In embodiments, software or code executable by a processor may allow, enable or provide for batch transcoding of compressed video over a network of multiple computers with shared storage of either a NAS or SAN configuration.

In embodiments, an encoder may provide compressed video such as, for example, a reference video, encoded respectively at a compression rate 30%, 40%, 50% or 60% greater than subject compressed video encoded in accordance with existing compression systems for the video distribution industry (IPTV, MSO). In embodiments, objective quality of compressed video files provided by an encoder may be compared to the quality of compressed files produced by a comparable encoder by compression of reference video, and may be assessed by functioning of an assessment (Video Clarity tool). Objective metrics such as, for example, DMOS/MOS, JND, and PSNR may be provided and compared. In embodiments, comparison of DMOS/MOS (DMOS—Differential Mean Option Score) provided by such an assessment tool is informative.

FIG. 5 depicts an exemplary embodiment having an aspect relating to a blind spot.

Figure 6:
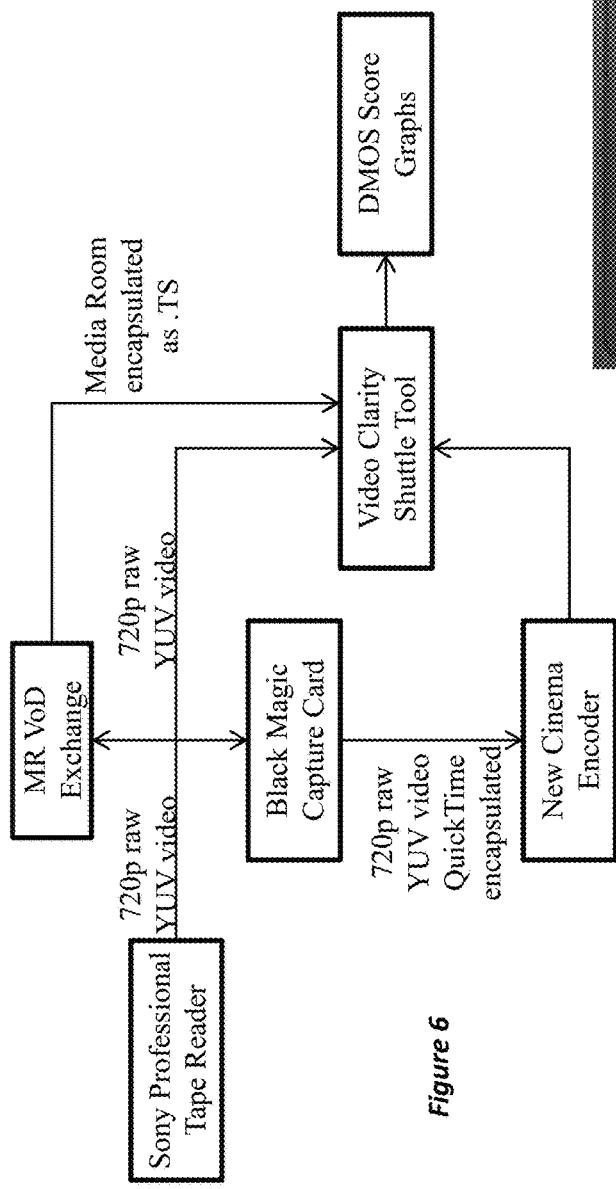
FIG. 6 depicts an exemplary embodiment in an aspect thereof providing compressed video, wherein objective assessment of video quality of compressed video is provided by comparing a Microsoft Media Room file produced by encoding a reference video sample (designated by Microsoft Corporation) with the Microsoft Media Room encoder product, and a file produced by encoding the same reference video source according to the embodiment, and illustrating objective video quality metrics for comparison.

FIG. 6 depicts an exemplary embodiment in an aspect thereof providing compressed video, wherein objective assessment of video quality of compressed video is provided by comparing a Microsoft Media Room file produced by encoding a reference video sample (designated by Microsoft Corporation) with the Microsoft Media Room encoder product, and a file produced by encoding the same reference video source according to the embodiment, and illustrating objective video quality metrics for comparison.

Figure 7:
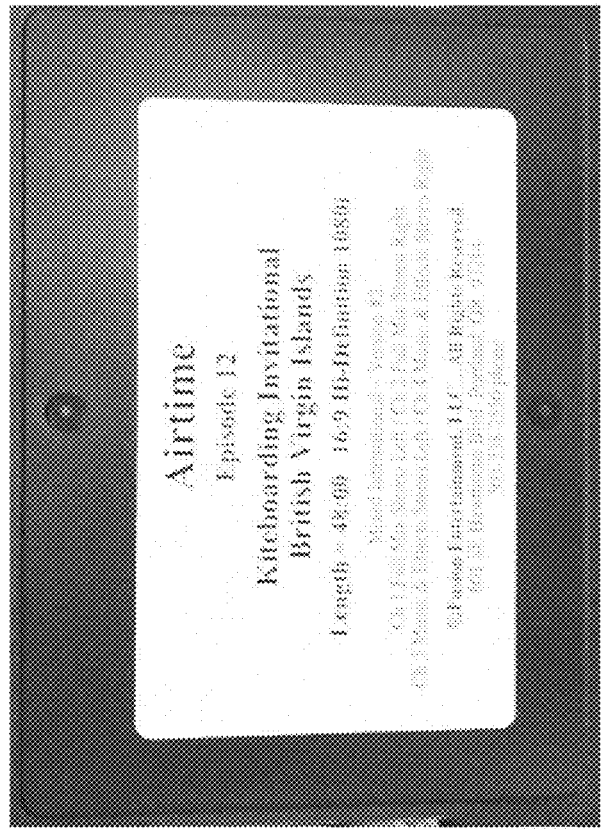
FIG. 7 depicts for an embodiment shown generally in FIG. 6 a photograph of a reference video sample.
Figure 8:
FIG. 8 depicts for an embodiment shown generally in FIG. 6 a second photograph of a reference video sample.

It will be understood that the same assessment tool (Video Clarity tool) may be used for objective assessment of the video quality of a Microsoft Media Room file encoded from a reference video source, which may be the same reference video source related in the preceding sentence. It will be understood that such a reference video source may be recommended by Microsoft. FIGS. 7 and 8 provide objective quality metrics for compressed video provided by encoding of a reference video source as discussed hereinabove according to embodiment, in comparison to compressed video otherwise encoded. Referring to FIGS. 7 and 8, in embodiments an encoder may be tested in relation to encoding 1080i video from a Sony HDCAM-SR HD tape deck via the Frame Converter Option board HKSR-5001 to 720p @ 59.94 fps to provide non-interlaced content. For comparison, a reference file may be encoded using Microsoft Media Room as follows: 720p @ 59.94 fps, AVC, CABAC, Main Profile@Level4.0, 4 ref. frames, at 9 Mbits per second. The reference file may be encoded, according to embodiments, as follows: 720p @ 59.94 fps, AVC, CABAC, Main Profile@Level4.0, 4 ref. frames, from 2 Mbits to 4.5 Mbits per second.

Figure 9:
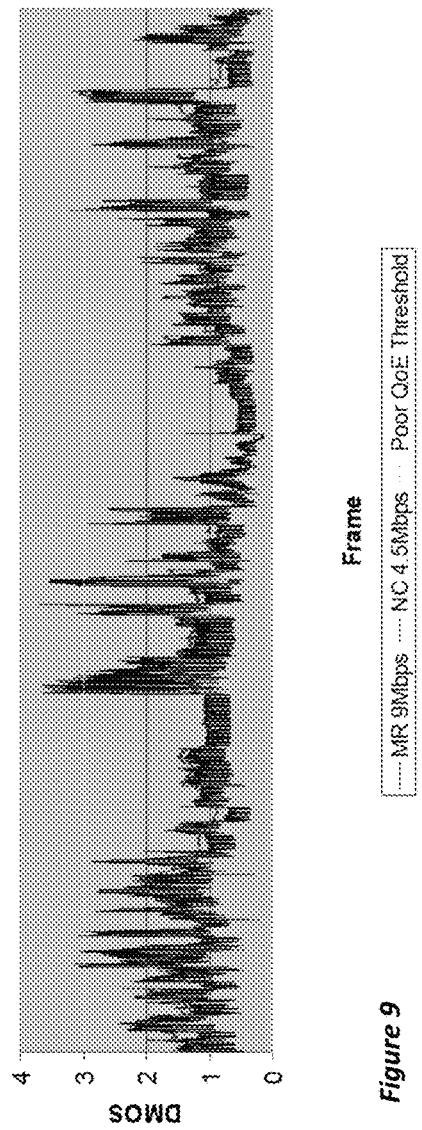
FIG. 9 depicts for an embodiment a graph of test results representing quality metrics for compressed video produced by encoding a reference video sample of FIG. 6 according to the embodiment at a bitrate of 4.5 Mbps and for comparison thereto quality metrics for compressed video produced by encoding a reference video sample of FIG. 6 with a Microsoft Media Room encoder at a bitrate of 9.0 Mbps.

FIG. 9 depicts for an embodiment a graph of test results representing quality metrics for compressed video produced by encoding a reference video sample of FIG. 6 according to the embodiment at a bitrate of 4.5 Mbps and for comparison thereto quality metrics for compressed video produced by encoding a reference video sample of FIG. 6 with a Microsoft Media Room encoder at a bitrate of 9.0 Mbps.

Figure 10:
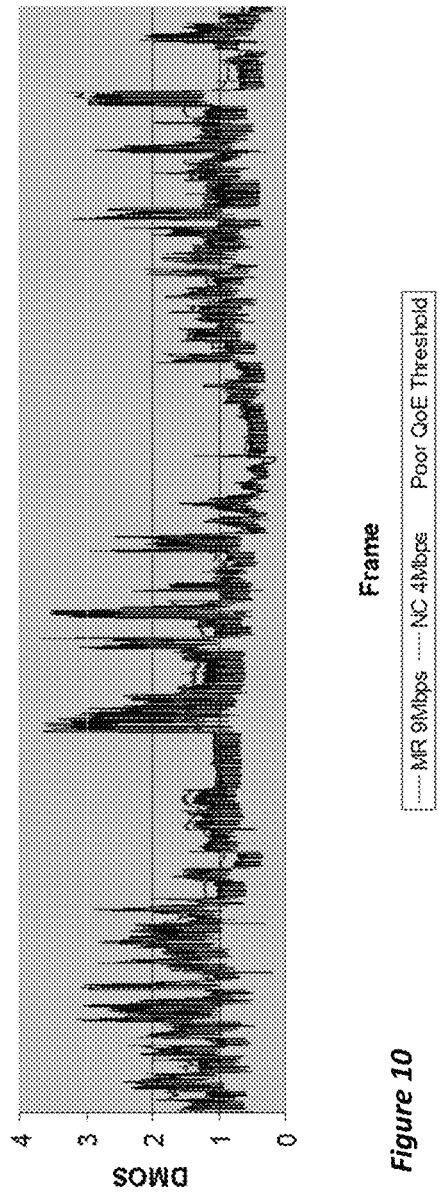
FIG. 10 depicts for an embodiment a graph of test results representing quality metrics for compressed video produced by encoding a reference video sample of FIG. 6 according to the embodiment at a bitrate of 4.0 Mbps and for comparison thereto quality metrics for compressed video produced by encoding a reference video sample of FIG. 6 with a Microsoft Media Room encoder at a bitrate of 9.0 Mbps.

FIG. 10 depicts for an embodiment a graph of test results representing quality metrics for compressed video produced by encoding a reference video sample of FIG. 6 according to the embodiment at a bitrate of 4.0 Mbps and for comparison thereto quality metrics for compressed video produced by encoding a reference video sample of FIG. 6 with a Microsoft Media Room encoder at a bitrate of 9.0 Mbps.

Figure 11:
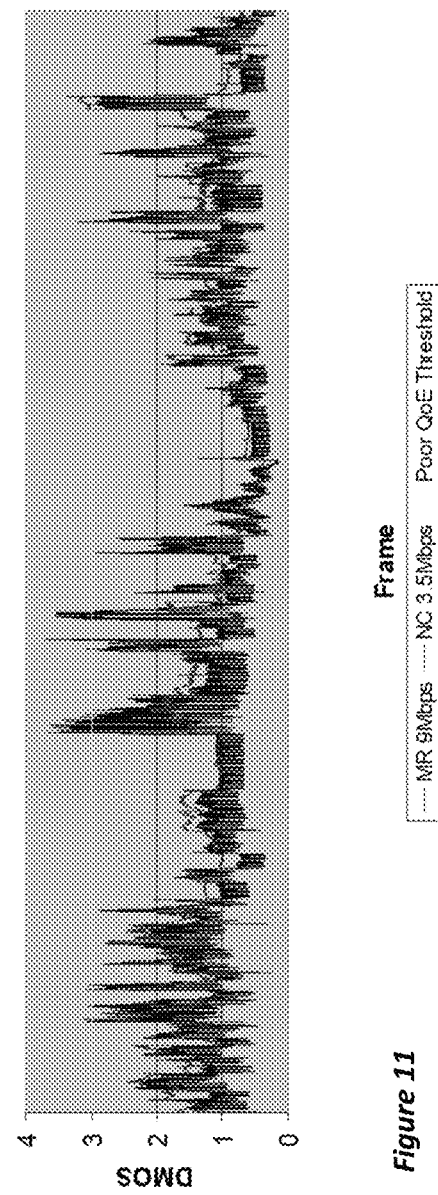
FIG. 11 depicts for an embodiment a graph of test results representing quality metrics for compressed video produced by encoding a reference video sample of FIG. 6 according to the embodiment at a bitrate of 3.5 Mbps and for comparison thereto quality metrics for compressed video produced by encoding a reference video sample of FIG. 6 with a Microsoft Media Room encoder at a bitrate of 9.0 Mbps.

FIG. 11 depicts for an embodiment a graph of test results representing quality metrics for compressed video produced by encoding a reference video sample of FIG. 6 according to the embodiment at a bitrate of 3.5 Mbps and for comparison thereto quality metrics for compressed video produced by encoding a reference video sample of FIG. 6 with a Microsoft Media Room encoder at a bitrate of 9.0 Mbps.

Figure 12:
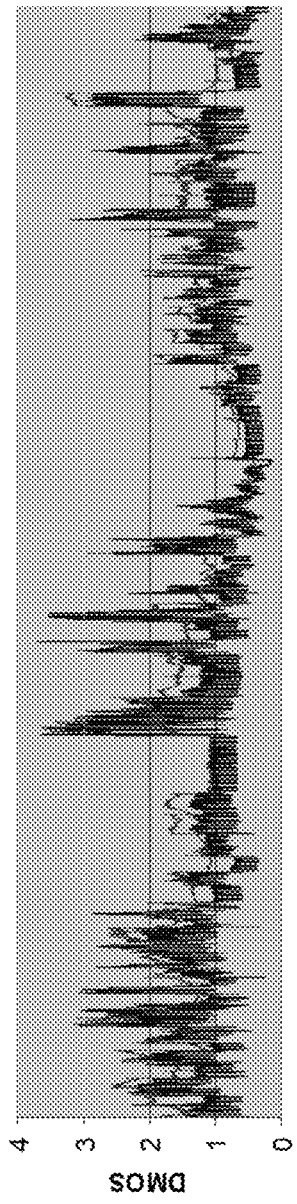
FIG. 12 depicts for an embodiment a graph of test results representing quality metrics for compressed video produced by encoding a reference video sample of FIG. 6 according to the embodiment at a bitrate of 3.0 Mbps and for comparison thereto quality metrics for compressed video produced by encoding a reference video sample of FIG. 6 with a Microsoft Media Room encoder at a bitrate of 9.0 Mbps.

FIG. 12 depicts for an embodiment a graph of test results representing quality metrics for compressed video produced by encoding a reference video sample of FIG. 6 according to the embodiment at a bitrate of 3.0 Mbps and for comparison thereto quality metrics for compressed video produced by encoding a reference video sample of FIG. 6 with a Microsoft Media Room encoder at a bitrate of 9.0 Mbps.

Figure 13:
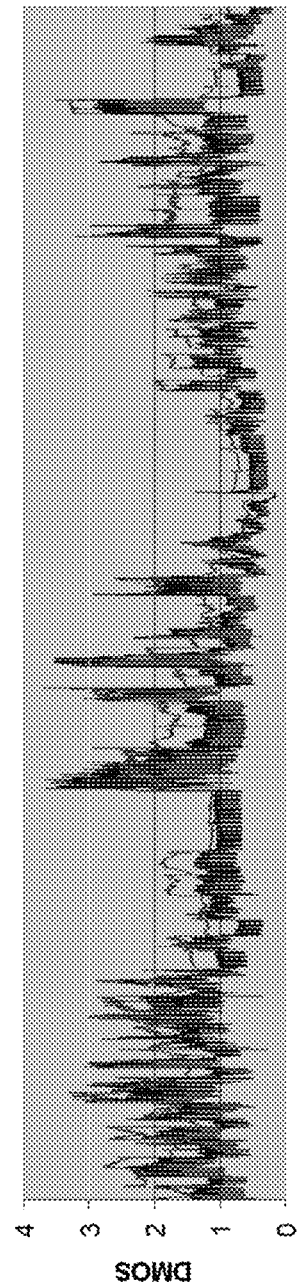
FIG. 13 depicts for an embodiment a graph of test results representing quality metrics for compressed video produced by encoding a reference video sample of FIG. 6 according to the embodiment at a bitrate of 2.5 Mbps and for comparison thereto quality metrics for compressed video produced by encoding a reference video sample of FIG. 6 with a Microsoft Media Room encoder at a bitrate of 9.0 Mbps.

FIG. 13 depicts for an embodiment a graph of test results representing quality metrics for compressed video produced by encoding a reference video sample of FIG. 6 according to the embodiment at a bitrate of 2.5 Mbps and for comparison thereto quality metrics for compressed video produced by encoding a reference video sample of FIG. 6 with a Microsoft Media Room encoder at a bitrate of 9.0 Mbps.

Figure 14:
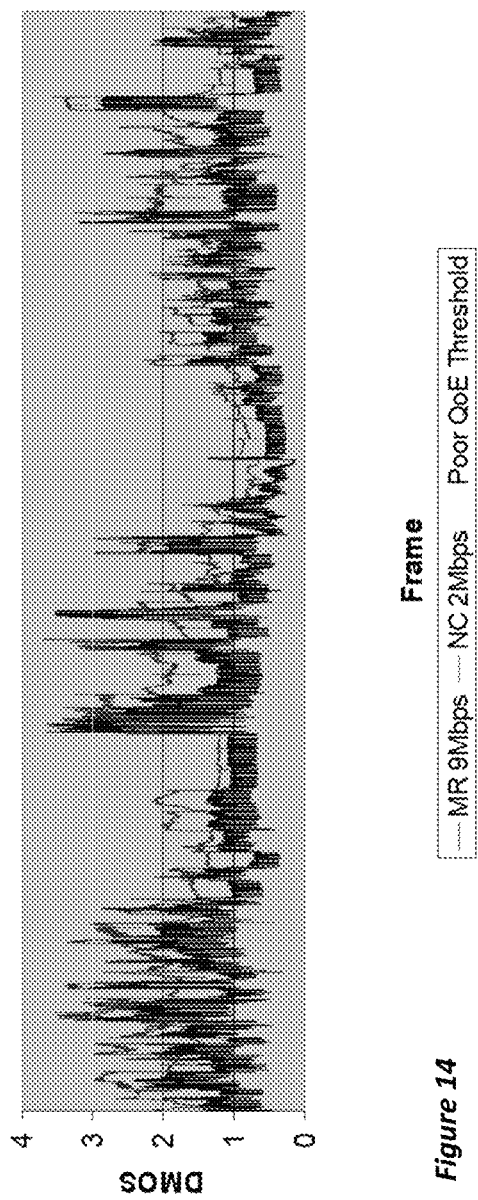
FIG. 14 depicts for an embodiment a graph of test results representing quality metrics for compressed video produced by encoding a reference video sample of FIG. 6 according to the embodiment at a bitrate of 2.0 Mbps and for comparison thereto quality metrics for compressed video produced by encoding a reference video sample of FIG. 6 with a Microsoft Media Room encoder at a bitrate of 9.0 Mbps.

FIG. 14 depicts for an embodiment a graph of test results representing quality metrics for compressed video produced by encoding a reference video sample of FIG. 6 according to the embodiment at a bitrate of 2.0 Mbps and for comparison thereto quality metrics for compressed video produced by encoding a reference video sample of FIG. 6 with a Microsoft Media Room encoder at a bitrate of 9.0 Mbps.

In embodiments, encoded compressed video of HD quality QoE may have DMOS/MOS scores and may be provided at video bit rates as low as 3 Mbps. In such embodiments, for example, encoded compressed video may be provided with a bitrate reduction of substantially 66% in comparison to encoding by Microsoft Media Room of the same file, such as a reference file. Embodiments may provide at improved bitrates encoding having similar overall appearance to other compressed video, such as compressed video of a reference video file. In embodiments, encoding may preserve the crispness and sharpness of the main moving objects. In embodiments, decoded and reconstructed compressed video may include that a main or primary moving object may appear to be sharper and crispier than in reference video encoded via a different system and manner.

Embodiments of disclosed subject matter may be suitable to provide and may encode and decode compressed video. Embodiments provide for compressing video at a bitrate, or into a number of bits per frame, where limits such as, for example, bandwidth limitations or effective bandwidth constraints are imposed by network infrastructure, and other network traffic, of a communication network over which the compressed video is to be transmitted to recipients. Effective bandwidth constraints may be imposed, for example, due to network infrastructure having low capacity on one or more channels, sub-networks or branches, or due to the network carrying other traffic or transmissions. Where a communication network includes, for example, a heterogeneous Internet Protocol (IP) network, constraints such as bandwidth, noise, interference, channel errors, and fading can create effective bandwidth constraints in different channel environments and for different network paths and destinations. Recipients of compressed video over a network may include, for example, display devices, computers, storage devices or storage infrastructure, or mobile devices such as tablet computers or smartphones.

It will be understood that embodiments may provide methods, systems, apparatus, storage medium, encoders for encoding, and decoders for decoding, compressed video of high or improved image quality at comparable or reduced bitrates in comparison to other systems and in compliance with hybrid coding standards such as, for example, H.264, H.264/AVC, MPEG-x, and HEVC standards. As used herein "encoder" may include and describe, without limitation, methods, systems, apparatus, code, software, hardware, coding, and encoder for encoding or processing pictures, frames, video, or video data to provide compressed video in a bitstream on the fly or stored in memory. As used herein "decoder" may include and describe, without limitation, methods, systems, apparatus, code, software, hardware, coding, and decoder for decoding or processing pictures, frames, video, or video data to decode a bitstream or compressed video on the fly or stored in memory.

It will be understood that in hybrid coding, temporal redundancy is removed by motion compensated prediction (MCP). A video is typically divided into a series of groups of pictures (GOP) where each GOP begins with an intra-coded frame (I) followed by an arrangement of forward predicted frames (P) and bi-directional predicted frames (B). Both P-frames and B-frames are inter-frames. Profiles and levels provide a means of defining subsets of syntax and semantics based on decoding capabilities required to decode a particular bitstream. Profiles and levels may specify restrictions on bitstreams and hence place limits on capabilities for decoding a bitstream. In general, a decoder is deemed to be conformant to a given profile at a given level of a standard if such a decoder is capable of all allowed values of all syntactic elements specified by that profile at that level. It will be understood that embodiments of disclosed subject matter may provide methods, systems, apparatus, and storage medium for coding compressed video that are compliant with one or more hybrid coding standards including, without limitation, H.264, H.264/AVC, MPEG-x, and HEVC standards. It will be understood that according to embodiments an encoder may create a compressed bitstream on the fly or stored in memory.

It will be understood that the H.264, H.264/AVC, HEVC and similar standards describe data processing and manipulation techniques that are suited to compression of video, audio and other information using fixed or variable length source coding techniques. In particular, these and other hybrid coding standards and techniques compress video information using intra-frame coding techniques (such as, for example, run-length coding, Huffman coding and the like) and inter-frame coding techniques (such as, for example, forward and backward predictive coding, motion compensation, and the like). Specifically, in the case of video processing systems, hybrid video processing systems are characterized by prediction-based compression encoding of video frames with intra-frame and/or inter-frame motion compensation encoding.

As used herein, intra-frame coding refers to encoding a picture (a field or frame) without reference to any other picture, but the intra-coded frame (I-frame) can be used as a reference for other frames. The terms "intra-frame", "intra-coded frame" and "I-frame" are examples of video objects formed with intra-coding, as referenced in this disclosure.

As used herein, inter-frame coding, or predictive coding, refers to encoding a picture (a field or frame) with reference to another picture. Compared to the intra-coded frame, the inter-coded or predicted frame (or P-frame) may be coded with greater efficiency. The terms "P-frame", "inter-coded frame" and "inter-frame" are used herein to describe video objects formed with inter-coding. Bi-directional predicted frames are referred to as "B-frames". Other terms that may be used by those of skill for video objects formed with inter-coding may include high-pass coding, residual coding, motion compensated interpolation, and other names known to those of ordinary skill in the art.

It will be understood that in hybrid encoding schemes, such as those referenced hereinabove, predictive coded pixel blocks (i.e., blocks that comprise one or more motion vectors and a residual error component) are encoded, and thereafter decoded, with respect to a reference frame. It will be understood that an intra-frame (I-frame) or another predicted frame (P-frame) may serve as a reference frame.

Figure 15:
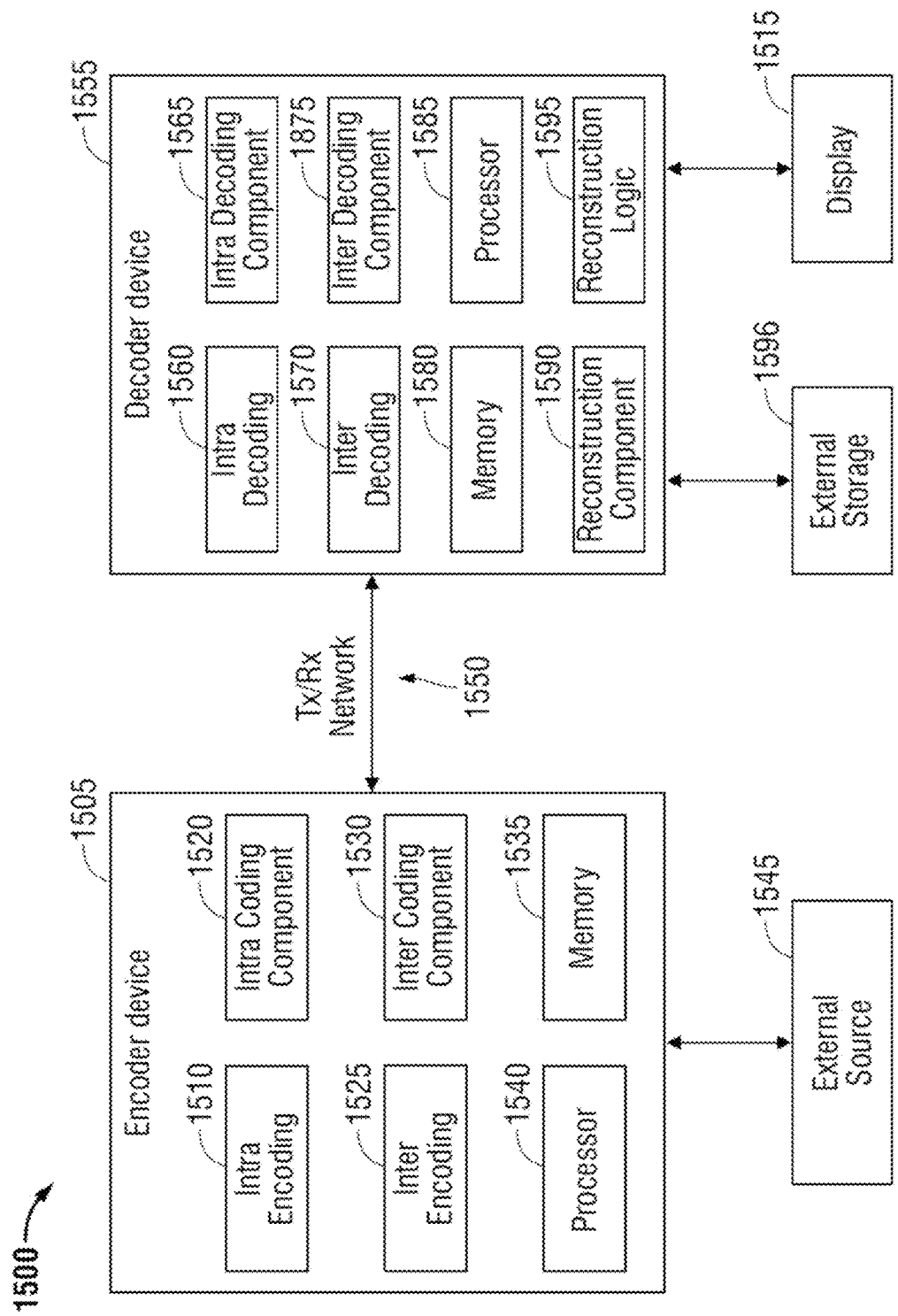
FIG. 15 is a block diagram of an exemplary embodiment of a communications system for encoding and decoding a bitstream of compressed video.

FIG. 15 is a block diagram of an exemplary embodiment of a communications system 1500 for encoding and decoding a bitstream of compressed video. One of ordinary skill will understand that, as used herein, video may include streaming pictures or frames. Communications system 1500 may include a processor 1540 and memory 1535. Communications system 1500 may include video source 1545. It will be understood that video source 1545 may include, for example, live video or near-real time video from a video camera source. Alternatively, the video source may be video stored in memory 1535, storage, or a server; or video provided from an external network such as the Internet. It will be understood that video from video source 1545 may be in a raw, un-encoded state or encoded, for example, in a video format (such as P video). Communications system 1500 may include encoder device or encoder 1505. Encoder 1505 may include intra-coding component 1520. Intra-coding component 1520 may be configured and operable to encode intra-coded frames (I-frames). Intra-coding component 1520 may include intra-coding logic 1510 for encoding intra-coded frames (!-frames). Encoder 1505 may include inter-coding component 1530. Inter-coding component 1530 may be configured and operable to encode predicted frames (P-frames). Inter-coding component 1530 may include inter-coding logic 1525 for encoding predicted frames (P-frames). In embodiments, encoder 1505 may provide an encoded bitstream on the fly and/or an encoded bitstream stored inmemory.

Referring to FIG. 15, communications system 1500 may include network 1550 in communication with decoder device or decoder 1555 for transmitting an encoded bitstream including compressed video to decoder 1555. From network 1550 decoder 1555 may receive, decode, and reconstruct, an encoded bitstream including compressed video that has been transmitted over network 1550. Decoder 1555 may include intra-decoding component 1565 including intra-decoding logic 1560 and operable for decoding intra-coded frames (I-frames). Decoder 1555 may include inter-decoding component 1575 including inter-decoding logic 1580 and operable for decoding predicted frames (P-frames). It will be understood that decoder 1555 may include a reconstruction component 1590 including reconstruction logic 1595 and operable for reconstructing the encoded bitstream. It will be understood that the decoder 1555 may provide a reconstructed bitstream to a suitable display device 1515. Alternatively, decoder 1555 may provide a reconstructed bitstream to a memory or storage, a network interface, or to a computing device for other processing such as, for example, object detection.

It will be understood that communications system 1500 may include a transcoder device or transcoder (not shown). It will be understood that a transcoder may be located, for example, between different networks, sub-networks, channels, or branches for performing transcoding functions such as receiving from encoder 1505 an encoded bitstream and transmitting the same.

In an exemplary embodiment, a hybrid coding scheme may comply with the H.264 standard. In an embodiment, an H.264 video encoder may perform prediction, transform and encoding processes (see FIG. 3) to produce an H.264 compressed bitstream. An H.264 video decoder may perform complementary processes of decoding, inverse transform and reconstruction to produce a decoded video sequence.

It will be understood that hybrid coding may provide improvements in compression efficiency with increased computational complexity. For example, a search may be performed for matching a current block with a predictor block, such as by searching the reference frame in a search window around the position of the block in the current frame. It will be understood that algorithms for simplifying the number of calculations for motion estimation can be classified as pel-recursive, block-based or object based. Pel-recursive methods generally may require operations on each pixel and for this reason typically require a large number of operations per frame. Object-based methods may require computational complexity in performing operations for object recognition. Block matching by attempts to perform efficient block-based searching has been attempted. Examples of attempts to perform block-based searching include fast motion estimation (FME) algorithms such as: three-step search (TSS), new three-step search (NTSS), four-step search (4SS), block-based gradient descent search (BBGDS), diamond search (DS), hexagon-based search (HEXBS), unsymmetrical-cross multi-hexagon grid search (UM-HexagonS), predictive motion vector field adaptive search technique (PMVFAST), and enhanced predictive zonal search algorithm (EPZS) are some fast motion estimation (FME) algorithms. Generally, the fast motion estimation (FME) algorithms may be considered as being carried out in the spatial domain, with computational efficiency depending on the shape and size of the search pattern and on efficient choice of the search center to increase the speed of the motion vector search. Disadvantages include that the FME techniques may fail to identify the best predictor block, and may fall into local distortion minimums. Disadvantages of FME techniques include, also, that the number of search points depends on the shape of the search pattern, and computational complexity depends upon size of the search area and resolution of the video. Another disadvantage of the preceding methods for motion estimation is that blocks generally must be processed sequentially and cannot be terminated early, because choice of motion vector and search depend on previous iterations and processing of neighboring blocks or macroblocks. The difference block may be transmitted from the encoder 1620. It will be understood that the (x.y) offset of the current block from the predictor block can be characterized as a motion vector. It will be understood that the difference blocks, and difference coefficients thereof, may be quantized according to a Quantization Parameter (QP). It will be understood that improvements in compression efficiency can be achieved because usually the "difference block" has much lower information content than the original block.

Figure 16:
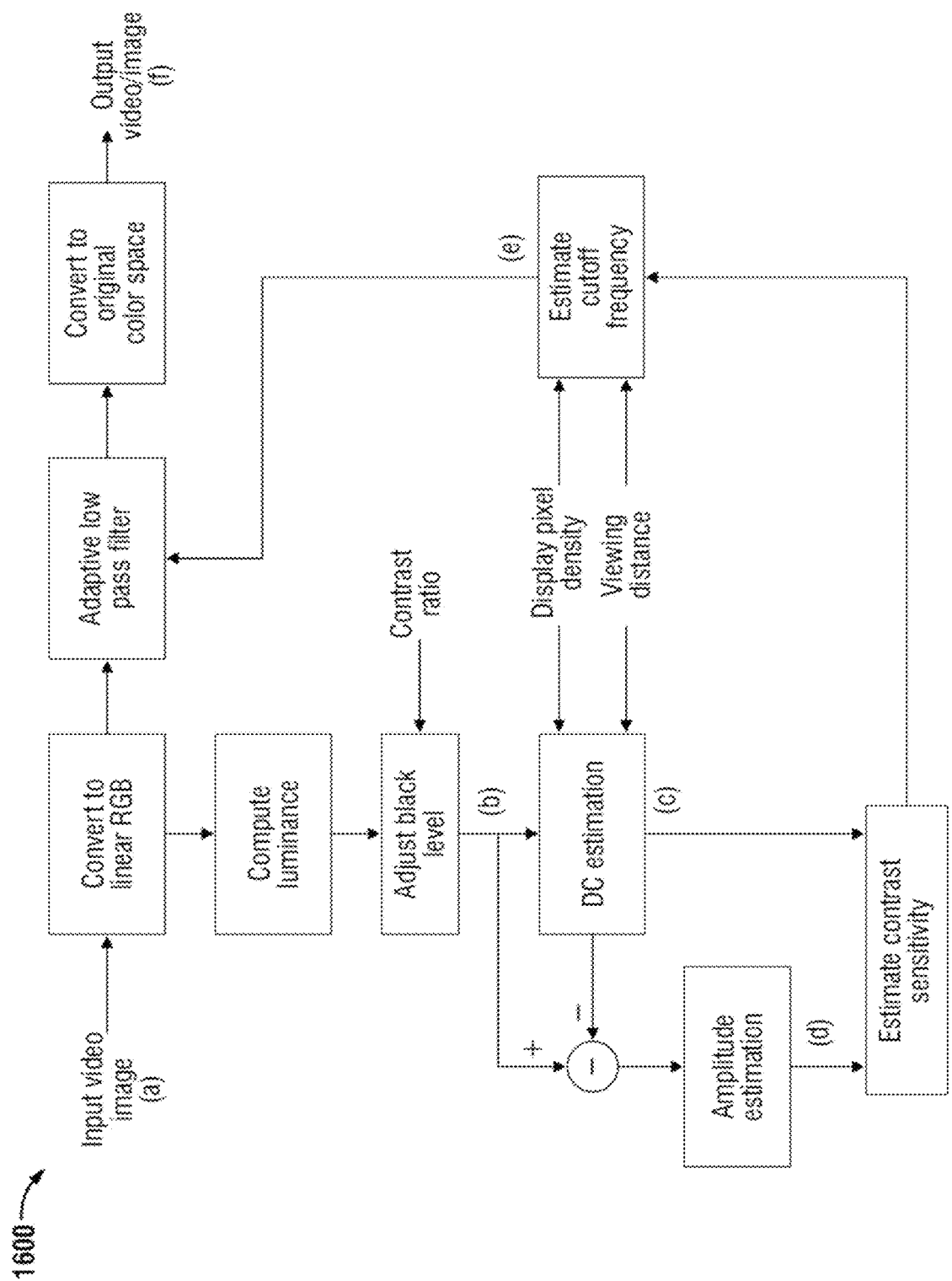
FIG. 16 illustrates a block diagram of an exemplary embodiment of a video processing system for perceptual filtering of video image data.

FIG. 16 illustrates a block diagram of an exemplary embodiment of a video processing system 1600 for perceptual filtering of video image data. Video processing system 1600 may be, for example, a spatial filter for processing each frame in a video sequence independently as an image. The filter receives an input video image 1605. In alternative embodiments, the filter may also receive additional inputs such as viewing distance between a display and a viewer/user, an effective contrast ratio of the display, and pixel density of the display. The input video image 1605 is first converted to linear RGB space 1610. Next, the luminance channel is computed 1615. The black level is then adjusted 1620. The contrast ratio 1625 may be the effective contrast ratio of a display. Local DC values are estimated 1630 by, for example, applying a Gaussian low pass filter. Amplitude estimation 1635 is then performed on the difference image. The difference image is obtained by taking the absolute difference between the DC estimation 1630 and the luminance and image (the output of black level adjustment 1620). The contrast sensitivity is subsequently estimated 1650. Next, the cutoff frequency is estimated 1655. The cutoff frequency may be estimated 1655, for example, by employing the Movshon and Kiorpes CSP model, which yields an algorithm for computing the highest visible frequency. Once the cutoff frequency is estimated 1655, the estimated frequency is passed as a parameter to an adaptive low pass filter 1660. Finally, a conversion to the desired output color format 1665 is performed, and the video or image signal is output 1670.

Figure 17:
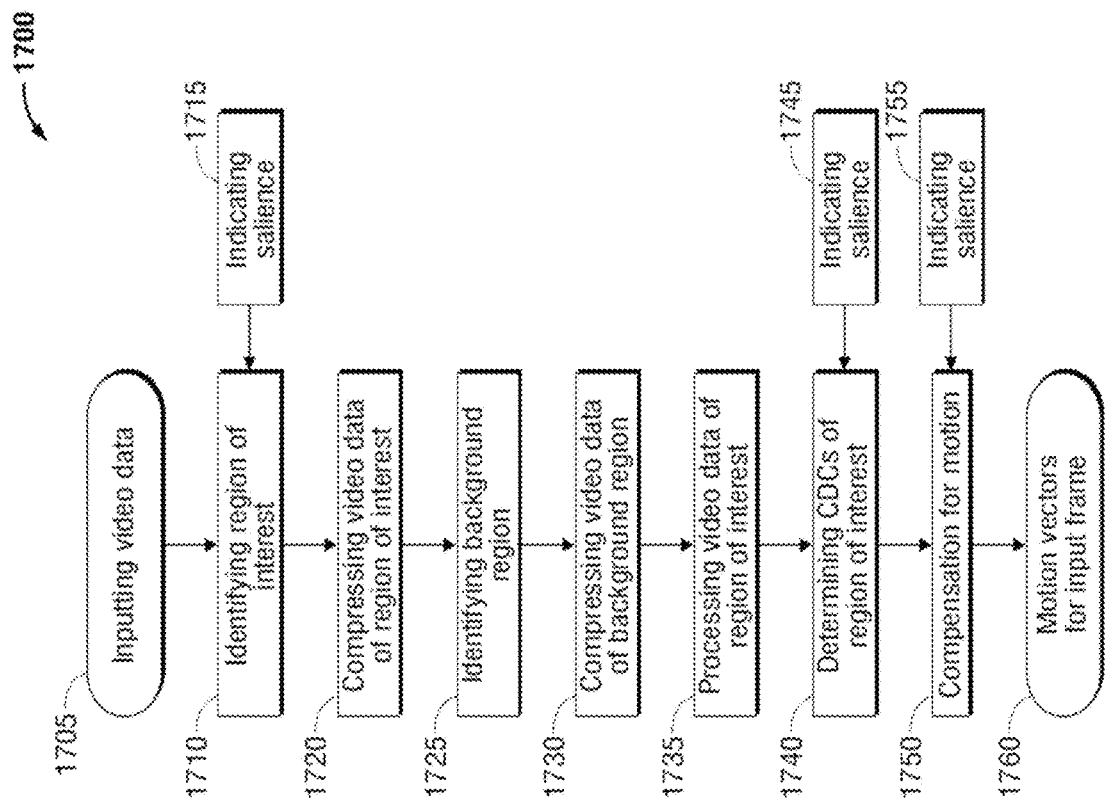
FIG. 17 illustrates a method for encoding video frames in a bitstream according to an embodiment.

FIG. 17 illustrates method 1700 according to an embodiment. Method 1700 may be a method for encoding video frames in a bitstream. Method 1700 may be performed by at least one processor of an encoder. Method 1700 may include: receiving 1705 video data for a sequence of pictures. Method 1700 may include: identifying 1710 a region of interest in a picture, the region of interest identified by processing at least some of the video data according to a visual perception model, the visual perception model comprising at least one of the following: Motion perception of changes in pixel and pixel movement that correlates to visual attention in picture and/or visual pixel changes based on color depth and change. In an embodiment, method 1700 may include: compressing 1720 video data of the region of interest at a first bitrate. Method 1700 may include: compressing 1730 video data of a background region at a second bitrate, the first bitrate exceeding the second bitrate. In an embodiment, method 1700 may further include: wherein a sum of the first bitrate and the second bitrate does not exceed a target bitrate. In an embodiment, method 1700 may further include: wherein the target bitrate does not exceed an effective bitrate constraint of a network in communication with the encoder. In an embodiment, method 1700 may further include: wherein the target bitrate does not exceed an effective bitrate constraint of the encoder.

Referring to FIG. 17 it will be understood that in an embodiment, method 1700 may further include: in the identifying 1710 the visual perception model further comprising determining 1710 the region of interest in relation to a point of visual interest. In an embodiment, method 1700 may further include: processing 1735 video data of the region of interest to provide greater image quality for compressed video data of the region of interest than for video data of the background region. Referring to FIG. 17 it will be understood that in an embodiment, method 1700 may further include: the identifying 1710 further including referring 1715 to a salience indicator for identifying the region of interest, the salience indicator relating to intra-frame video data. Referring to FIG. 17 it will be understood that in an embodiment, method 1700 may further include: the identifying 1710 further including: referring 1715 to a salience indicator for identifying the region of interest, the salience indicator relating to inter-frame video data. Referring to FIG. 17 it will be understood that in an embodiment, method 1700 may further include: determining 1740 edges of the region of interest. It will be understood that in an embodiment, method 1700 may further include: the determining 1740 further comprising referring 1745 to a salience indicator for said determining edges, the salience indicator relating to intra-frame video data. It will be understood that in an embodiment, method 1700 may further include: the determining 1740 further comprising referring 1745 to a salience indicator for the determining edges, the salience indicator relating to inter-frame video data. Referring to FIG. 17 it will be understood that in an embodiment, method 1700 may further include: compensating 1750 for motion of video data for the region of interest. Referring to FIG. 17 it will be understood that in an embodiment, method 1700 may further include: the compensating 1750 further comprising referring 1755 to a salience indicator for the motion of video data for the region of interest, the salience indicator relating to intra-frame video data. Referring to FIG. 17 in an embodiment, method 1700 may further include: the compensating 1750 further comprising referring 1755 to a salience indicator for the motion of video data for the region of interest, the salience indicator relating to inter-frame video data. Method 1700 may further comprise outputting the video data 1760.

Figure 18:
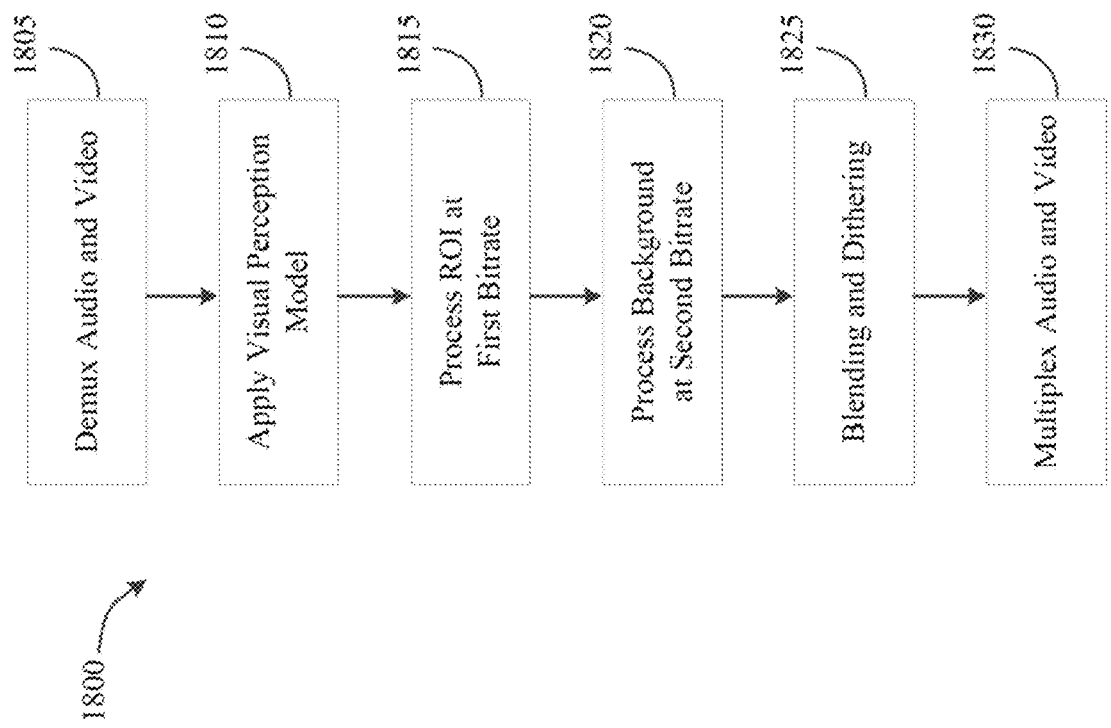
FIG. 18 illustrates a block diagram of an exemplary embodiment of a system for encoding and decoding a bitstream of video.

FIG. 18 illustrates method 1800 according to an embodiment. Method 1800 may be a method for encoding video frames in a bitstream. Method 1800 may be performed by at least one processor, such as at least one processor of an encoder. In embodiments, the video coding method 1800 may begin or start with a source comprised of video, audio, or both. The video and audio portions of the source may be separated by, for example, a demultiplexer 1805. The audio portion of the source is set aside and the video portion of the source is further processed. In other embodiments, the audio portion of the source may be stored, manipulated, or processed. The method for encoding video frames 1800 may estimate the area where a viewer of said video will focus 1810 visual attention. The method for encoding video frames 1800 may determine a region of attention or an object of interest in accordance with a visual perception model 1810 by, for example, analyzing motion in the objects rendered or displayed in the video. The visual perception model 1810 may include or function by considering several video metrics such as luminance and motion vectors. Visual perception model 1810 may also consider salience and the results of edge detection within individual video frames. In an embodiment, visual perception model 1810 may include or function by considering the following video metrics: luminance, motion vectors and salience.

In an embodiment shown in FIG. 18, the region of attention or object of interest may be identified in the frame and that portion of the frame may be processed 1815 at a first bitrate. In an embodiment, the processing 1815 may be accomplished without physically isolating the region of attention or object of interest from the remainder of the frame. In an embodiment, the processing 1815 may be accomplished or performed without isolating a representation, such as a data model, of the region of interest or object of interest, from the remainder of the frame. In an embodiment, the region of attention or object of interest may be processed 1815 with limits based on a first bitrate such as, for example, the bitrate of the video source. The background may be processed 1820 with the second or remaining bitrate, where the second or remaining bitrate is provided by deducting from a target bitrate the first bitrate selected for processing the region of attention or object of interest. In embodiments, the region of attention or object of interest may be processed by, for example, determining the maximum quality at a given bitrate based on the ratio or percentage of the size of the region of attention or object of interest compared to the original video source frame. The remainder of the original video source frame (i.e., the original video source frame excluding the region of attention or object of interest) may be processed based on overhead left at the given bitrate calculated from the region of attention or object of interest.

Referring to FIG. 18, after encoding, both the visual attention region and the remainder of the original video source may be blended together 1825 to ensure or provide a resulting full frame of video. In embodiments, the blending 1825 may include performing a dithering function on the background or the region of attention or object of interest portions of the video. In embodiments, the visual quality of the resulting full frame provided by blending 1825 may be improved by applying a "clean up" or "stitching" process. For example, a video filter such as a deblocking filter may be applied to the resulting full frame to improve the visual quality and prediction performance by smoothing the sharp edges which may form between macroblocks when block coding techniques are used. After processing, the resulting full frame may be recombined 1830 with corresponding audio to produce a final video wrapper. The video coding method may accomplish the recombination 1830 by, for example, a multiplexer.

Figure 19:
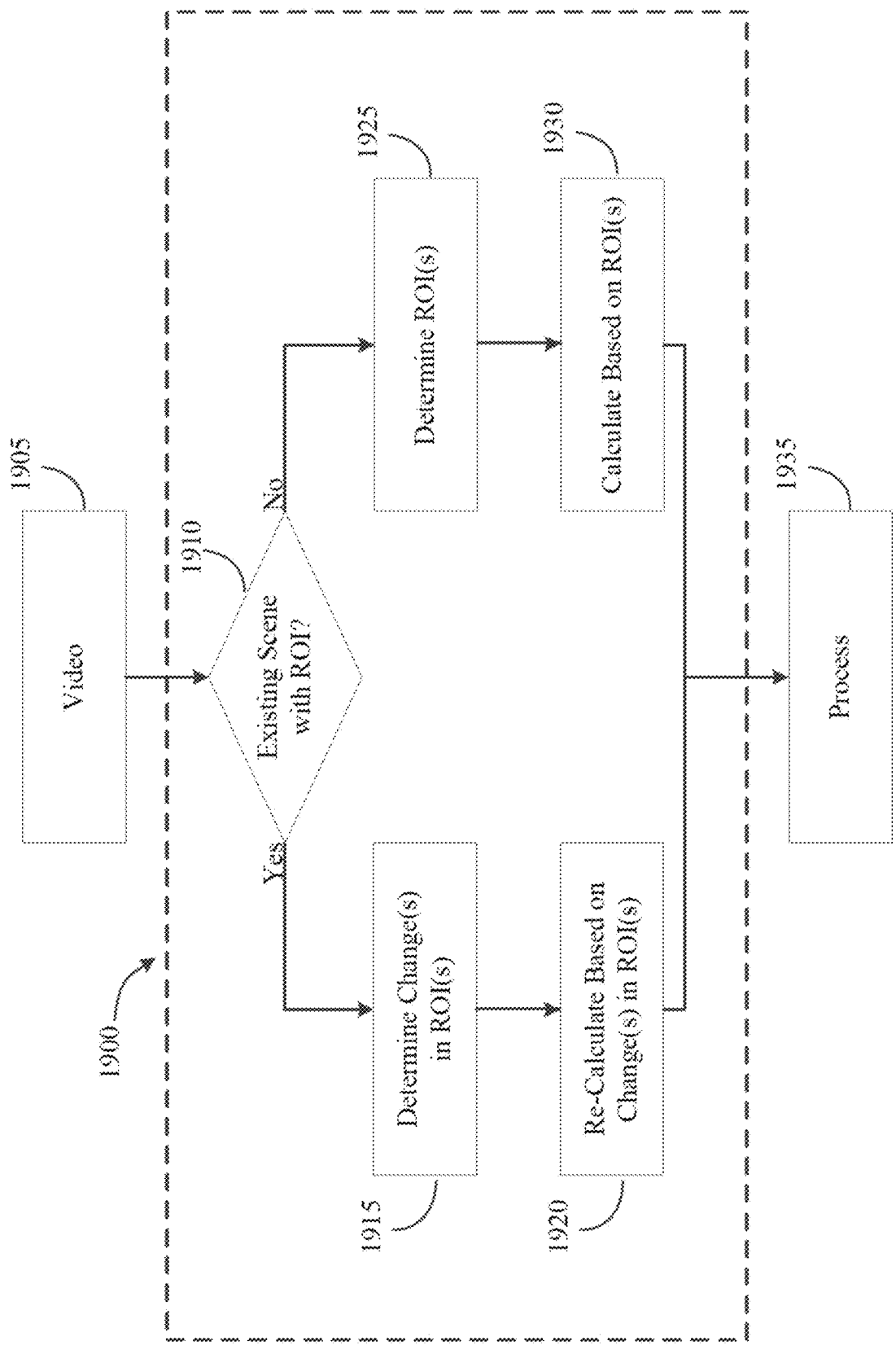
FIG. 19 illustrates a block diagram of an exemplary embodiment of a system for applying a visual perception model.

FIG. 19 illustrates method 1900 according to an embodiment. Method 1900 illustrates a block diagram of an exemplary embodiment of a method for applying a visual perception model as seen in FIG. 18. Method 1900 may be performed by at least one processor of an encoder. In embodiments, the visual perception model 1900 receives a source video 1905. The visual perception model 1900 determines 1910 if the source video 1905 is an existing or ongoing scene with an already determined region of interest or object of attention. If the source video 1905 is an existing or ongoing scene with an already determined region of interest or object of attention, the visual perception model 1900 determines 1915 if there has been a change in the region of interest or object of attention. The visual perception model 1900 then re-calculates 1920 the region of interest or object of attention metrics based on the change in the region of interest or object of attention. If the source video 1905 is not an existing or ongoing scene with an already determined region of interest or object of attention, the visual perception model 1900 determines 1925 the region of interest or object of attention. The visual perception model 1900 then calculates 1930 the region of interest or object of attention metrics based on the newly determined region of interest or object of attention. The results or output of the visual perception model 1900 can be further processed 1935 by, for example, encoding the region of interest or object of attention and the background at a first and second bitrate as seen in FIG. 18.

Figure 20:
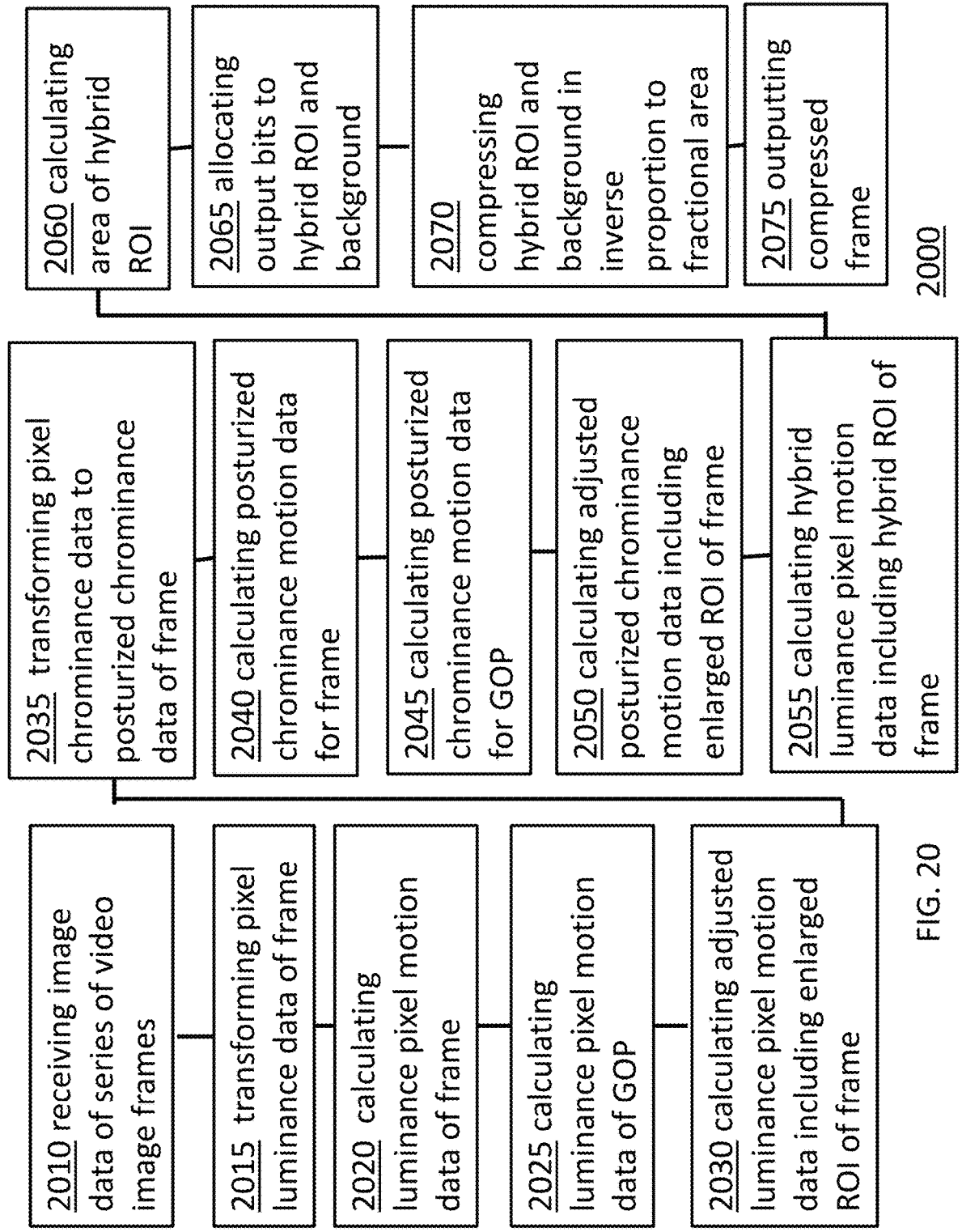
FIG. 20 illustrates a method for encoding video with region of interest compression in an exemplary embodiment.

Illustrated in FIG. 20 is a computer-implemented method 2000 for encoding video with region of interest compression in an exemplary embodiment. Method 2000 may include receiving 2010 image data of a series of video image frames. It will be understood that, for example, the video may be compliant with h.264/AVC. The video, which may be compliant with h.264/AVC, may include a series of coded pictures provided by a plurality of slices such as, for example, I, P, B, SP and SI slices. The video, such as h.264/AVC video, may include pixel luminance and pixel chrominance data. The pixel luminance and pixel chrominance data, for example, may be provided in Y:Cb:Cr format, where Y may be luminance data in lumens, Cb may be chrominance on a scale of grayscale to blue shades, and Cr may be chrominance on a scale of grayscale to red shades. In the particular arrangement shown in FIG. 20, the computer-implemented method 2000 encodes video compliant with h.264/AVC to selectively improve visual perception of displayed video rendered from decoded video, wherein the encoded video is compressed under a bitrate constraint.

As shown in FIG. 20, method 2000 may include transforming 2015 graduated grayscale pixel luminance data to binary saturated pixel luminance data for each frame of video in a series of video image frames or video images that is input to a video compression encoder. It will be understood that transforming 2015 the pixel luminance data may include transforming graduated grayscale pixel luminance data to simplified binary, black and white saturated pixel luminance data. The saturated pixel luminance data may be binary pixel luminance data that forms a black and white pixel luminance map of the frame of video, and which is derived from corresponding graduated grayscale pixel luminance data of the same frame of video. Transforming 2015 the pixel luminance data for each frame of video may include performing a transform operation on the graduated grayscale pixel luminance data. The transform operation, for example, may include determining a grayscale gradient pixel luminance midpoint value, mean, average, or designated transformation value for differentiating or selecting between values of graduated grayscale pixel luminance data when being transformed to binary values corresponding to black pixels and white pixels of a saturated luminance map.

As shown in FIG. 20, method 2000 may include calculating 2020 luminance pixel motion data of each frame. The luminance pixel motion data may include a base luminance region of interest of each frame. The luminance pixel motion data of each frame may form a pixel motion map based on luminance of each frame. It will be understood that the luminance pixel motion data of a frame may be calculated by comparing pixel luminance data for the frame with pixel luminance data for the preceding frame. In an embodiment, the pixel motion data may be represented as a pixel motion vector, and the pixel motion map may include pixel motion vectors based on luminance.

As shown in FIG. 20, method 2000 may include calculating 2025 luminance pixel motion data of the GOP of video. As used herein, "GOP" means "Group of Pictures." The luminance pixel motion data may include an excess luminance region of interest of each GOP. The excess luminance region of interest of the GOP may exceed the base luminance region of interest when overlain in a map of the frame. The luminance pixel motion data of each GOP may form a pixel motion map based on luminance of each GOP. It will be understood that the luminance pixel motion data of a GOP may be calculated by comparing pixel luminance data for the GOP with pixel luminance data for the preceding GOP. It will be understood that the GOP may change as frames change. In an embodiment, the pixel motion data may be represented as a pixel motion vector, and the pixel motion map may include pixel motion vectors based on luminance.

As shown in FIG. 20, method 2000 may include calculating 2030 adjusted luminance pixel motion data of each frame. The adjusted luminance pixel motion data may include an enlarged luminance region of interest ("ROI") for each frame. The enlarged luminance region of interest of each frame may include both the base luminance region of interest of the frame and, in addition, may include that portion of the excess luminance region of interest of the GOP in excess of the base luminance region of interest of the frame. The adjusted luminance pixel motion data of each frame may form a pixel motion map based on adjusted luminance of each frame. The enlarged luminance region of interest ("ROI") may include a base ROI calculated for luminance pixel motion data for the frame and, in addition to the base ROI, also may include an excess ROI calculated for luminance pixel motion data for the GOP that is in excess of the base ROI. It will be understood that enlarged luminance ROI may include both the base ROI and the excess GOP ROI. It will be understood that the luminance pixel motion data of a frame may be calculated by comparing pixel luminance data for the frame with pixel luminance data for the preceding frame. It will be understood that the luminance pixel motion data of a GOP may be calculated by comparing pixel luminance data for the GOP with pixel luminance data for the preceding GOP. In an embodiment, the pixel motion data may be represented as a pixel motion vector, and the pixel motion map may include pixel motion vectors based on luminance.

Method 2000 may include transforming 2035 pixel chrominance data of each frame to posturized chrominance data of each frame.

Method 2000 may include calculating 2040 posturized chrominance motion data of each frame. The posturized chrominance motion data may include a base chrominance region of interest of each frame.

Method 2000 may include calculating 2045 posturized chrominance motion data of each GOP. The posturized chrominance motion data may include an excess chrominance region of interest of each GOP. The excess chrominance region of interest of each GOP may exceed the base chrominance region of interest when overlain in a map of the frame.

Method 2000 may include calculating 2050 adjusted posturized chrominance motion data of each frame. The adjusted posturized chrominance motion data may include an enlarged chrominance region of interest for each frame. The enlarged chrominance region of interest of each frame may include both the base chrominance region of interest of each frame and, in addition, that excess chrominance region of interest of each GOP that is in excess of the base chrominance region of interest of each frame. It will be understood that the excess chrominance region of interest of each GOP may exceed the base chrominance region of interest when overlain in a map of the frame.

Method 2000 may include calculating 2055 hybrid pixel motion data of each frame. The hybrid pixel motion data may include a hybrid region of interest of each frame. The hybrid region of interest of each frame may include both the enlarged luminance region of interest of each frame and, in addition, that excess portion of the enlarged chrominance region of interest of each frame that is in excess of the enlarged luminance region of interest of each frame. It will be understood that the excess portion will be contiguous with the enlarged luminance region of interest. It will be further understood that a plurality of excess portions may be contiguous with different portions of the enlarged luminance region of interest.

Method 2000 may include calculating 2060 area of the hybrid region of interest of each frame. Method 2000 may include allocating 2065 output bits representing the hybrid luminance region of interest of each frame in proportion to fractional area of the hybrid luminance region of interest in relation to total area of each frame.

Method 2000 may include compressing 2070 image data. Compressing 2070 may include compressing the hybrid luminance region of interest of each frame in inverse proportion to fractional area of the hybrid luminance region of interest of each frame in relation to total area of each frame. Compressing 2070 may include compressing image data of background of each frame in inverse proportion to fractional area of the background of each frame in relation to total area of each frame.

Method 2000 may include outputting 2075 from the encoder compressed image data of each frame, wherein the compressed image data of each frame may include the compressed image data of the hybrid luminance region of interest of the frame and compressed image data of the background of the frame.

Figure 21:
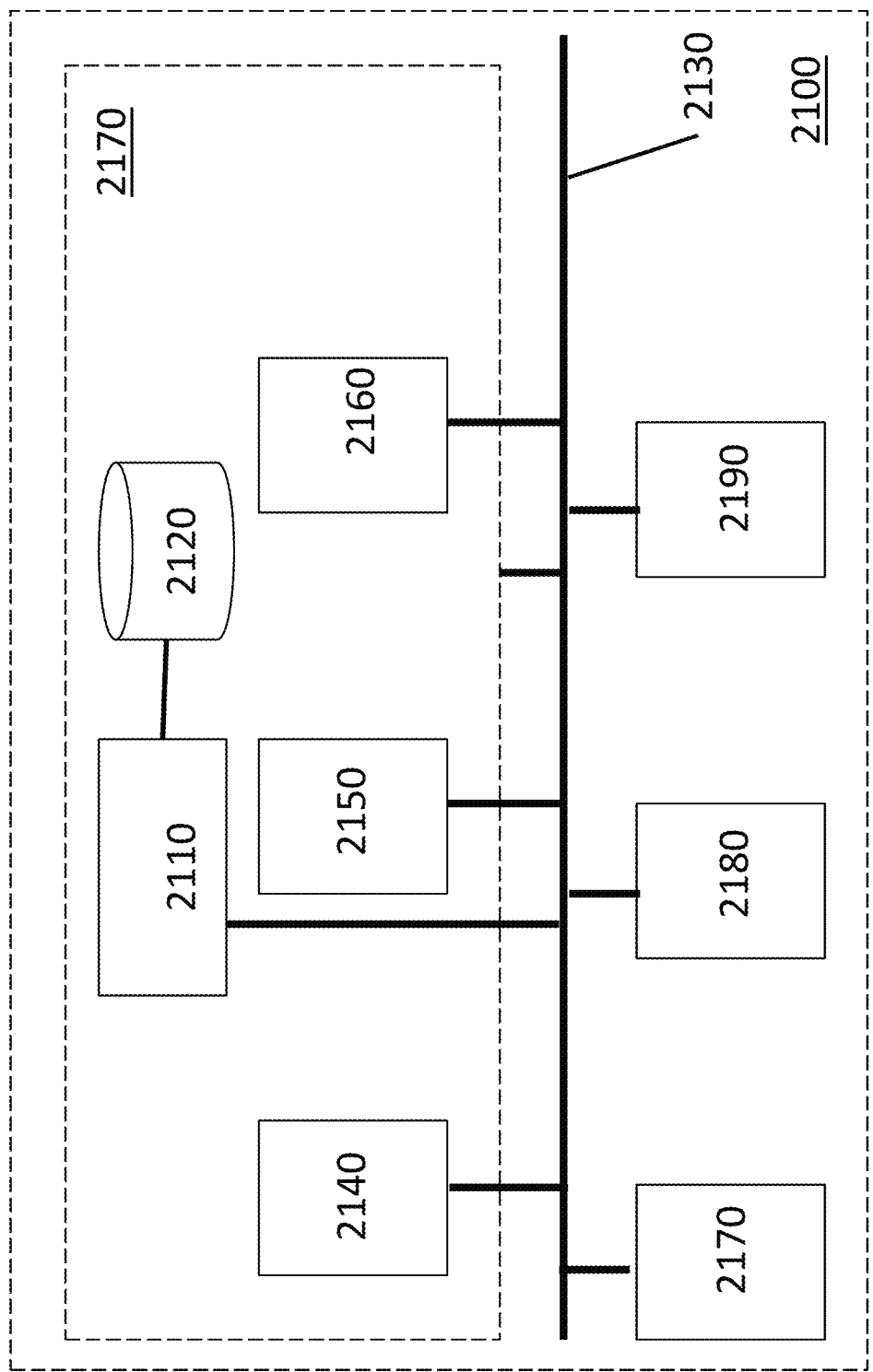
FIG. 21 illustrates a schematic simplified block diagram of a system for encoding video.

Illustrated in FIG. 21 is a system 2100 for encoding video compliant with h.264/AVC under a bitrate constraint, to selectively improve visual perception of displayed video rendered from decoded video. System 2100 may include a video compression subsystem 2170 configured to perform compression of video with region of interest compression. System 2100 may include a network interface 2170 configured for receiving and outputting data packets over a network in compliance with communications protocols of the network, such as for example, Internet Protocol. System 2100 may include an h.264/AVC encoding module 2180 for encoding compressed video in compliance with the h.264/AVC or another advanced video compression protocol. System 2100 may include a bitrate management module 2190 for managing compression and outputting of compressed video image data in compliance with a bitrate constraint, which may be a variable or fixed bitrate constraint, determined for the communications network downstream of the system 2100. Video compression subsystem 2170 may include a video frame processing module 2140 configured for processing frames of video in the performing of region of interest processing. The video frame processing module 2140 may be configured, for example, to perform for each frame and GOP (where applicable) transformation of grayscale pixel luminance data to binary saturated pixel luminance data for each frame, calculation of luminance pixel motion data, production of pixel motion maps, posterization of pixel chrominance data, and production of hybrid pixel motion data. Video compression subsystem 2170 may include a region of interest allocation module 2150 configured for allocating bits for compression of a region of interest in inverse relationship to the fraction or portion of the video frame determined for the region of interest and allocating remaining bits for compression of a background region. Video compression subsystem 2170 may include a region of interest processing module 2160 configured for compressing the region of interest in relation to the bits allocated for compression of same, from the region of interest allocation module 2150. The region of interest processing module 2160 may be configured for compressing the background region in relation to bits allocated for compression of same, from the region of interest allocation module 2150. The system 2100 for encoding video with region of interest compression may include a system bus 2130 for operations.

Although example diagrams to implement the elements of the disclosed subject matter have been provided, one skilled in the art, using this disclosure, could develop additional hardware and/or software to practice the disclosed subject matter and each is intended to be included herein. In addition to the above described embodiments, those skilled in the art will appreciate that this disclosure has application in a variety of arts and situations and this disclosure is intended to include the same.

What is claimed is:

1. A computer-implemented method of encoding video to provide video compliant with a video compression standard selected from H.265/HEVC and H.266/VVC under a bitrate constraint, said method comprising:
- receiving image data of a series of frames;
- transforming graduated grayscale pixel luminance data of each frame to binary saturated pixel luminance data for each frame;
- calculating luminance pixel motion data of each frame, the luminance pixel motion data including a base luminance region of interest of each frame;
- calculating luminance pixel motion data of each GOP, the luminance pixel motion data including an excess luminance region of interest of each GOP;
- calculating adjusted luminance pixel motion data of each frame, said adjusted luminance pixel motion data including an enlarged luminance region of interest for each frame, the enlarged luminance region of interest of each frame including both the base luminance region of interest of the frame and in addition thereto that portion of the excess luminance region of interest of the GOP in excess of the base luminance region of interest of the frame;
- transforming pixel chrominance data of each frame to posturized chrominance data of each frame;
- calculating posturized chrominance motion data of each frame, the posturized chrominance motion data including a base chrominance region of interest of each frame;
- calculating posturized chrominance motion data of each GOP, the posturized chrominance motion data including an excess chrominance region of interest of each GOP;
- calculating adjusted chrominance pixel motion data of each frame, said adjusted chrominance pixel motion data including an enlarged chrominance region of interest for each frame, the enlarged chrominance region of interest of each frame including both the base chrominance region of interest of each frame and in addition thereto the excess chrominance region of interest of each GOP in excess of the base chrominance region of interest of each frame; and
- calculating hybrid pixel motion data of each frame, said hybrid pixel motion data including a hybrid region of interest of each frame, the hybrid region of interest of each frame including both the enlarged luminance region of interest of each frame and in addition thereto that portion of the enlarged chrominance region of interest of each frame in excess of the enlarged luminance region of interest of each frame.

2. A computer-implemented method according to claim 1, said method comprising:
- allocating output bits representing the hybrid luminance region of interest of each frame in proportion to fractional area of the hybrid luminance region of interest of each frame in relation to total area of each frame.

3. A computer-implemented method according to claim 1, said method comprising:
- compressing image data of the hybrid luminance region of interest of each frame in inverse proportion to fractional area of the hybrid luminance region of interest of each frame in relation to total area of each frame.

4. A computer-implemented method according to claim 3, said method comprising:
- compressing image data of background of each frame in inverse proportion to fractional area of the background of each frame in relation to total area of each frame.

5. A computer-implemented method according to claim 4, said method comprising:
- outputting the encoded video compressed under a bitrate constraint, the outputted encoded video comprising compressed image data of each frame, the compressed image data of each frame including the compressed image data of the hybrid luminance region of interest, the compressed image data of each frame including the compressed image data of the background of each frame.

6. A computer-implemented method according to claim 1, said method comprising:
- receiving, by a decoder, the compressed image data of each frame, the compressed image data meeting the bitrate constraint.

7. An encoder configured to perform the method of claim 1.

8. A system including an encoder according to claim 7.

9. A non-transitory computer readable medium including executable instructions which, when executed in a processing system, causes the processing system to perform the steps of the method of claim 1.

10. A computer-implemented method of encoding video to provide video compliant with a video compression standard selected from H.264/AVC, H.265/HEVC and H.266/VVC under a bitrate constraint, said method comprising:
- calculating adjusted luminance pixel motion data of a series of frames, said adjusted luminance pixel motion data including an enlarged luminance region of interest, the enlarged luminance region of interest including a base luminance region of interest and that portion of an excess luminance region of interest of a GOP in excess of the base luminance region of interest;
- calculating posturized chrominance motion data of the frames, the posturized chrominance motion data including a base chrominance region of interest;
- calculating posturized chrominance motion data of each GOP, the posturized chrominance motion data including an excess chrominance region of interest of each GOP;
- calculating adjusted chrominance pixel motion data of the frames, said adjusted chrominance pixel motion data including an enlarged chrominance region of interest of the frames, the enlarged chrominance region of interest of the frames including both the base chrominance region of interest of the frames and an excess chrominance region of interest of each GOP in excess of the base chrominance region of interest of the frames; and
- calculating hybrid pixel motion data of the frames.

* * * * *